(12) United States Patent
Tait et al.

(10) Patent No.: US 10,013,486 B2
(45) Date of Patent: Jul. 3, 2018

(54) SYSTEM, CONTENT EDITING SERVER, AUDIO RECORDING SLAVE DEVICE AND CONTENT EDITING INTERFACE FOR DISTRIBUTED LIVE PERFORMANCE SCHEDULED AUDIO RECORDING, CLOUD-BASED AUDIO CONTENT EDITING AND ONLINE CONTENT DISTRIBUTION OF AUDIO TRACK AND ASSOCIATED METADATA

(71) Applicant: OPENHD PTY LTD, Cronulla (AU)

(72) Inventors: Simon Tait, Sunbury (AU); Richard Powell, Singletons Mill (AU); Bruce Johnston, St. Kilda (AU)

(73) Assignee: OPENHD PTY LTD, Cronulla (AU)

( * ) Notice: Subject to any disclaimer, the term of this patent is extended or adjusted under 35 U.S.C. 154(b) by 0 days.

(21) Appl. No.: 15/555,279

(22) PCT Filed: Mar. 2, 2016

(86) PCT No.: PCT/AU2016/050132
§ 371 (c)(1),
(2) Date: Sep. 1, 2017

(87) PCT Pub. No.: WO2016/138556
PCT Pub. Date: Sep. 9, 2016

(65) Prior Publication Data
US 2018/0052922 A1     Feb. 22, 2018

(30) Foreign Application Priority Data

Mar. 3, 2015   (AU) ................................ 2015900735

(51) Int. Cl.
*H03G 3/20*     (2006.01)
*G06F 17/30*     (2006.01)
*G11B 27/031*     (2006.01)

(52) U.S. Cl.
CPC .. *G06F 17/30778* (2013.01); *G06F 17/30743* (2013.01); *G06F 17/30749* (2013.01); *G06F 17/30769* (2013.01); *G11B 27/031* (2013.01)

(58) Field of Classification Search
CPC .................................. H03G 3/20; G01R 23/02
(Continued)

(56) References Cited

U.S. PATENT DOCUMENTS 8,223,990 B1    7/2012  King
2005/0232614 A1* 10/2005 Griner .................. G11B 27/002
                                                             386/235

(Continued)

OTHER PUBLICATIONS

International Search Report & Written Opinion dated Jul. 13, 2016 from corresponding PCT Application No. PCT/AU2016/050132.

*Primary Examiner* — Melur Ramakrishnaiah
(74) *Attorney, Agent, or Firm* — Innovation Capital Law Group, LLP; Vic Lin (57) ABSTRACT

There is provided system for distributed live performance scheduled audio recording, cloud-based audio content editing and online content distribution of audio track and associated metadata. The system comprise a content editing server and a plurality of audio recording slave devices and at least one artist client computing device configure to display a content editing interface in communication with the content editing server via the Internet. In use the content editing interface is configurable to receive a live performance schedule such that the server is configured to configure an audio recording slave device with the live performance schedule such that the audio recording slave device records audio data of a live performance and uploads the data to the server. The content editing interface is then configured to display a track editing interface comprising at least one-time series waveform representation of the audio data stored by the server in the audio database, the time (Continued)

series waveform representation comprising track demarcation controls configured for controlling track time demarcations to demarcate a plurality of audio tracks and a metadata editing interface configured for editing metadata associated with each of the audio tracks. As such, the server is configured to distribute the plurality of audio tracks and associated metadata.

19 Claims, 3 Drawing Sheets

(58) Field of Classification Search
USPC .............................. 700/94; 361/1, 83; 84/602
See application file for complete search history.

(56) References Cited

U.S. PATENT DOCUMENTS

| | | | |
|---|---|---|---|
| 2005/0289338 A1* | 12/2005 | Stadlman | G06Q 30/06 713/153 |
| 2012/0093326 A1 | 4/2012 | Uchino et al. | |
| 2014/0047467 A1 | 2/2014 | Arling et al. | |
| 2014/0161263 A1 | 6/2014 | Koishida et al. | |

* cited by examiner

SYSTEM, CONTENT EDITING SERVER, AUDIO RECORDING SLAVE DEVICE AND CONTENT EDITING INTERFACE FOR DISTRIBUTED LIVE PERFORMANCE SCHEDULED AUDIO RECORDING, CLOUD-BASED AUDIO CONTENT EDITING AND ONLINE CONTENT DISTRIBUTION OF AUDIO TRACK AND ASSOCIATED METADATA

FIELD OF THE INVENTION

The present invention relates to a system, content editing server, audio recording slave device and content editing interface for distributed live performance scheduled audio recording, cloud-based audio content editing and online content distribution of audio track and associated metadata

BACKGROUND AND SUMMARY

Conventional recording, mixing and mastering of audio data for music production for retail comprises studio based sound recordings, subsequent digital mixing and mastering by audio professionals followed by music production release such as by way of physical media such as compact discs and the like or release to a content computer network.

Such a process is ill suited for music production of audio data from live performances, for reasons including sound recording problems, scheduling problems, time delays during the mixing and mastering process, licensing and digital rights management problems, content distribution platforms and the like.

U.S. Pat. No. 8,223,990 B1 (D1) relates to the problem removing noise from an audio signal (Col. 3, lines 20-23, FIG. 2, Col. 4, lines 27-31) by improving audio quality by reducing or removing wind noise (Col. 2, lines 19-29 and Col. 1 lines 34-43, Col. 3, lines 12-19 and FIG. 3).

As such, D1 discloses a solution of receiving an audio signal including audio data in multiple channels; identifying noise in the audio signal including identifying panning information for the audio data in the signal at each of multiple frequency bands; and attenuating the audio data at one or more frequency bands to generate an edited audio signal when the panning exceeds a specified threshold for each of the one or more frequency bands (Col. 1, lines 49-59).

US 20120093326 A1 (D2) relates to the problem of being able to easily search for a desired musical piece without stress from an unfathomably large number of musical pieces (Para. 0003).

Specifically, D2 discloses identifying musical "hooks" (being a climax of a musical piece) for musical piece searching so as to allow users to easily distinguish musical pieces without having to listen to introductory portion of a musical piece (Paras. 0004-0005). As such, D2 is directed to being able to accurately detect an audio change point based on an audio signal and extract a hook place at a high speed with high accuracy (Para. 0012).

Now, there is disclosed herein a system, content editing server, audio recording slave device and content editing interface for distributed live performance scheduled audio recording, cloud-based audio content editing and online content distribution of audio track and associated metadata.

Now, neither D1 nor D2 are directed to problems associated with audio content production for release on a content distribution network. Specifically, as discussed above, D1 is directed to reducing wind noise in audio signals, and D2 is directed to accurately identifying musical piece climaxes "hooks" for user musical piece discrimination convenience.

Further neither does D1 nor D2 disclose or even suggest the specific technical implementations disclosed herein relating to the main aspect of the embodiments describe herein of:
  a. the utilisation of a plurality of distributed audio recording slave devices at a plurality of venues for live performance scheduled audio recording, the plurality of distributed audio recording slave devices operably coupled to a content editing server,
  b. the artist scheduling of the audio recording slave devices using a cloud-based interface so as to cause the audio recording slave devices to automate the recording process,
  c. the cloud-based audio content editing process comprising:
    i. a track editing interface for track boundry demarcation for creating a plurality of audio tracks from the recorded audio; and
    ii. a metadata editing interface for generation of metadata for association with each of the plurality of audio tracks; or
  d. or content distribution of the audio data and associated metedata, including across a content distribution network.

Further neither does D1 nor D2 disclose or even suggest the specific technical implementations disclosed herein relating to the sub aspects of the embodiments describe herein of:
  a. Audio analysis of the audio data for automated live performance schedule end time variation detection;
  b. acoustic fingerprinting technique for automated track identification for automated generation of the metadata;
  c. automated audio levels optimisation of the audio data; or
  d. reporting rights holders' data specifying at least one nominated right holder to a performance rights society server.

Specifically, even were the problems of studio based sound recordings, subsequent digital mixing and mastering and music production release identified (which problems would probably not have been identified given at least the longevity of existing sound recording and mixing techniques), the notional person skilled in the art would not have implemented the end-to-end recording, editing and content release platform described herein. Rather, the person skilled in the art would have, and (especially considering so-called workshop improvements, design considerations and the like) may have been led, as a matter of course and by routing steps alone, rather to implement isolated improvements separately in relation to recording, content editing and distribution.

Furthermore, the end-to-end recording editing and content release platform described herein comprises significant technical obstacles to overcome, especially in the design of the audio slave recording devices to communicate with the content editing server, the client base interfaced artist configuration of recording schedules of the recording devices and the subsequent implementation of a cloud based editing interface, especially the responsive content editing interface disclosed herein for the purposes of audio track demarcation and metadata content generation.

Specifically, the system disclosed herein used autonomous recording hardware (audio recording slave devices) in combined with a suite of artist-facing content management tools allows for live performance audio data to be recorded, edited and released to a content distribution network for retail quickly and efficiently while meeting digital rights management and licensing requirements for adequate artist recompense.

Utilising a cloud-based content management system described herein, artists are able to create profiles/accounts for managing the scheduling, recording, mixing, mastering and optimisation of captured audio data from their live performances for distribution to an online retail network.

The system described herein implements a cloud-based content editing interface allowing for web or mobile-based configuration of recording schedules, cloud-based content editing of recorded audio data into individual tracks and the release of the individual tracks for online retail either through the system disclosed herein or $3^{rd}$ party content distribution network.

The cloud-based content editing allows the association of metadata and the individual tracks, the metadata including images and appropriate rightsholder information and ISRC codes to the tracks for digital distribution.

The cloud-based content editing interface may allow for the archiving of those recordings for release at a later date.

The content editing system disclosed herein implements a considerable back-end process to allow for the secure editing of high-quality sound recordings by artists.

The audio recording slave device is a recording device that is venue-deployed so as to, for example, using a pair of connected ambient microphones and a left and right feed from the mixing console, capture audio recordings of live performances.

The audio recording slave device is operably coupled to a content editing server via the internet for the uploading of recorded audio and subsequent cloud-based editing by artists through the secure content-editing interface.

The audio recording slave devices may be controlled to record audio data in accordance with schedules configured by the artist using the cloud based content editing interface implemented by the content editing server. Specifically, the audio recording slave devices may receive schedules from the content editing server for storage so as to be able to initiate audio recording functionality at specified schedule times.

Whereas performance end times may be scheduled the system disclosed herein may autonomously determine performance end times so as to, for example, ensure an encore is not inadvertently not recorded if a band plays beyond a schedule end time.

Specifically, during a 'local' moving window of configurable length, the audio recording slave device may probe for specific signal-amplitude cues that indicate that the performance has begun. Once the audio recording slave device has determined that the performance has begun, a second 'general' moving window of configurable length is established which is used to determine the performance's typical peak and average levels. If the incoming signal drops significantly below the peak and average levels as observed by such moving windows for a configurable period of time (typically, 2 'local' windows' duration) then it is determined that the performance has concluded, and thus the recording is finalised.

Furthermore, the system may be configured for autonomous track demarcation (the start and end time of separate tracks) detection. As such, live performance recordings appearing within artist's content editing interfaces may already have track demarcations.

The content editing system may implement audio data fingerprinting to automate the metadata generation and allocation process.

As such, using automated track demarcation and metadata generation and association, the artist content editing interface may display a complete recording of a performance with the tracks already demarcated and tagged with appropriate metadata, allowing for release to the content distribution network with little or no input from the artist.

The system may furthermore be configured for autonomous mixing, mastering and optimisation. In contrast to existing arrangements wherein mixing, mastering and optimisation is performed in a recording studio by a sound engineer (charging an hourly rate) for a period that often spans weeks and months, mixing, mastering and optimisation is performed autonomously by the system, allowing for the generation of digital music platform and broadcast quality audio.

The content editing server may be in constant communication with a plurality of audio recording slave devices (including up to many thousands of audio recording slave devices) in many venues around the world to query each audio recording slave devices for audio recording data ready for extraction.

The artist content editing interface enables artists to insert track marks to the audio recording (or edit track marks if this is already done), insert appropriate metadata and prepare the content for release, including via $3^{rd}$ party digital music distribution platforms.

Further to the above, the insertion of metadata into each track may allow the system to report live performances including tracks played with associated nominated rights holders to performance rights societies (such as APRA|AC-MOS in Australia) for associated nominated rights holder recompense.

The content editing interface may include additional editing tools allowing artists to edit their performances by enhancing the sound or incorporating tracks from various performances into one release (for example a track from each stop of a tour for the release a 'Tour Best Of').

As such, with the foregoing in mind, there are disclosed a system for distributed live performance scheduled audio recording, cloud-based audio content editing and online content distribution of audio track and associated metadata, the system comprising: a content editing server comprising a plurality of software modules comprising: a content editing interface management module configured for managing a client computing device content editing interface a plurality of audio recording slave devices in communication with the content editing server via Internet, each audio recording slave device comprising: an audio input interface configured to receive audio data from at least one audio input in use; and at least one artist client computing device in communication with the content editing server via the Internet, the client computing device configured to display a content editing interface managed by the content editing interface management module of the content editing server, wherein, in use: the content editing interface is configurable to receive a live performance schedule; the server is configured to configure an audio recording slave device with the live performance schedule received from the content editing interface; the audio recording slave device is configured for recording the audio data via the audio input interface in accordance with the live performance schedule; the server is configured for retrieving and storing, in an audio database, the audio data from the audio recording slave device; the content editing interface is configured to display: a track editing interface comprising at least one time series waveform representation of the audio data stored by the server in the audio database, the time series waveform representation comprising track demarcation controls configured for controlling track time demarcations to demarcate a plurality of audio tracks; and a metadata editing interface configured for editing metadata associated with each of the audio tracks; and the server is configured to distribute the plurality of audio tracks and associated metadata.

The server may be configured for audio analysis of the audio data for automated live performance schedule end time variation detection.

The audio analysis may comprise determining at least one of an average and peak value of the audio data for a first time window and detecting a drop in at least one of an average and peak value of the audio data for a subsequent time window.

The first time window may be a moving time window.

The audio analysis further may comprise detecting a signal amplitude cue indicative of a start of a performance.

The server may be configured for audio analysis of the audio data for automated track demarcation detection.

The audio analysis may comprise audio amplitude detection.

The track demarcation controls are placed at locations of the time series waveform in accordance with the automated track demarcation detection.

The lateral locations of the track demarcation controls are user configurable so as to vary the track time demarcations.

The timeseries waveform representation may comprise a major timeseries waveform representation representing the audio data and a minor timeseries waveform representation representing a subset of the audio data.

The timeseries waveform representation may be configured for panning.

The timeseries waveform representation may be configured for zooming.

The server may be configured for utilising an acoustic fingerprinting technique for automated track identification for automated generation of the metadata associated with each of the audio tracks.

The server may be configured for automated audio levels optimisation of the audio data.

The content editing interface further may comprise an audio level optimisation interface.

The server may be configured for reporting rights holders' data specifying at least one nominated right holder to a performance rights society server.

The server may be configured for utilising an acoustic fingerprinting technique for identifying the least one nominated right holder.

In distributing the plurality of audio tracks and associated metadata, the server may be configured to send the plurality of audio tracks and associated metadata to a 3rd party content distribution network server.

The audio input interface may comprise a stereo microphone interface.

The audio input interface may comprise a stereo mixing console interface.

The content editing interface may comprise at least one of a browser based and mobile phone software application-based interface.

In use, the server may be configured to: send audio configuration data to the audio recording slave device; the audio recording slave device may be configured to: output, via an audio output interface, audio configuration audio in accordance with the audio configuration data; receive, via the audio input interface, received audio configuration audio; and transmit, to the server, the received audio configuration audio.

The audio configuration audio may be at least one of white noise, swept sinewave and pink noise audio.

In use, the server may be further configured to make an audio configuration measurement in accordance with the received audio configuration audio.

In use, the server may be further configured to transmit, to the client computing device, the audio configuration measurement.

The audio recording slave device may be configured to transmit lossless audio data to the server.

The server may be configured to transmit downsampled audio data to at least one artist client computing device.

The metadata may comprise at least one of a start time of the track, an end time of the track, track name, at least one composer, at least one artist, at least one mixing engineer, a genre, a publisher, a label and keywords.

In use, the client computing device may be configured to receive, via the track editing interface, an audio licence selection; and this server may be configured to associate the plurality of audio tracks with the audio licence selection.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 3 shows an exemplary track editing interface of the track editing software application of the client computing device of the system of FIG. 1 and especially a metadata editing interface in accordance with embodiments of the present disclosure;

DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the system, content editing server, audio recording slave device and content editing interface for distributed live performance scheduled audio recording, cloud-based audio content editing and online content distribution of audio track and associated metadata are disclosed and described, it is to be understood that this disclosure is not limited to the particular configurations and process steps as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Figure 1:
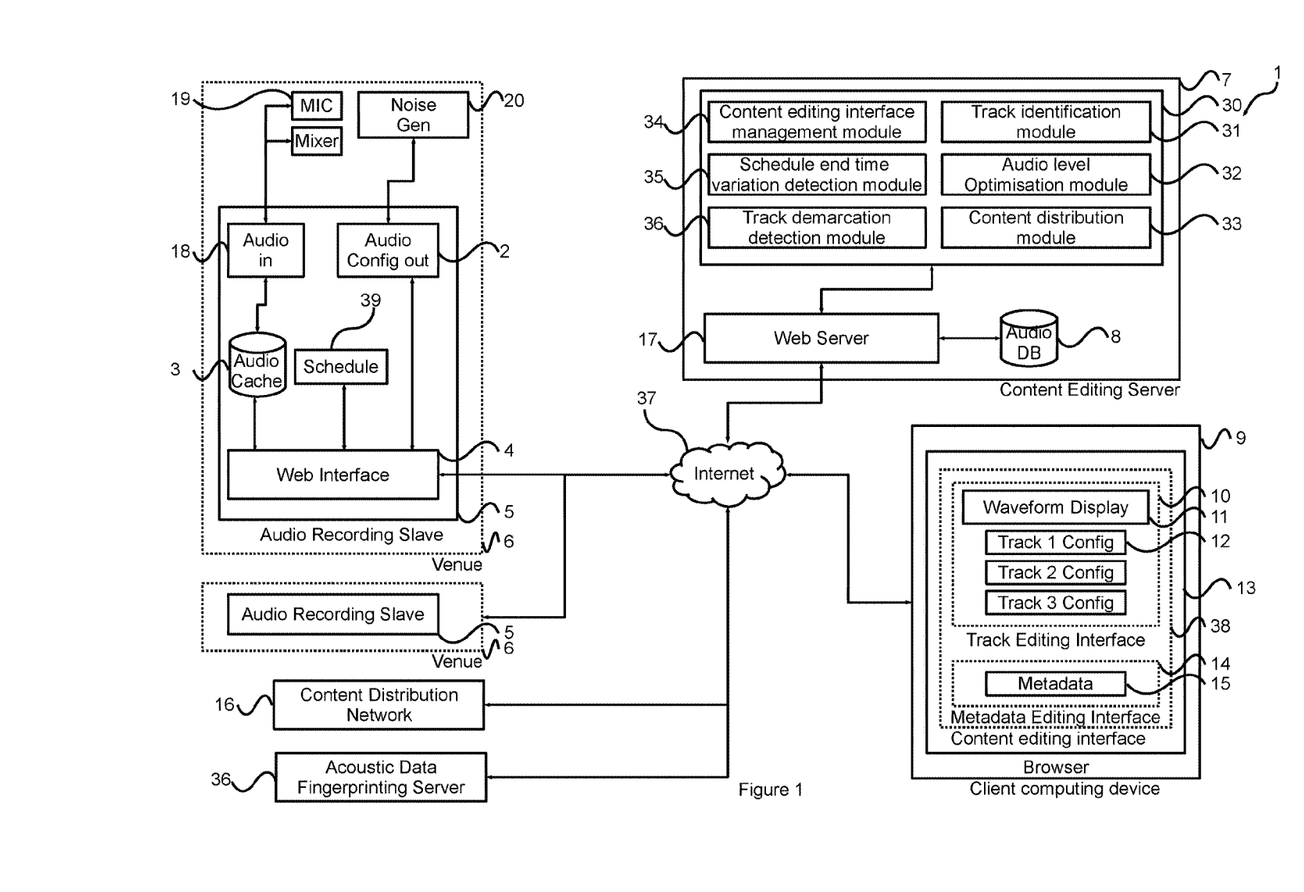
FIG. 1 shows a system for the live performance audio data capture for web-based configuration and online retail of audio tracks in accordance with an embodiment of the present disclosure.

A System for Distributed Live Performance Scheduled Audio Recording, Cloud-Based Audio Content Editing and Online Content Distribution of Audio Track and Associated Metadata Turning at FIG. 1, there is shown a system 1 for distributed live performance scheduled audio recording, cloud-based audio content editing and online content distribution of audio track and associated metadata.

The system 1 comprises a cloud-based content editing server 1. It should be noted that while "content editing" nomenclature of the server 7 is indicative of the primary purpose of the server 1, it should be noted that the server 7 performs other functionality over and above content editing including that which is described herein.

In general terms, the term "cloud-based" should be construed generally as a term that refers to applications, services or resources made available to users on demand via the Internet, including from the content editing server 7.

As will be described in further detail below, the content editing server 7 is in operable communication with a plurality of audio recording slave devices 5 in a plurality of venues 6 via the Internet 37 so as to record audio data from schedule live performances.

Having recorded the audio data, the content editing server 7 is configured to make the recorded audio data available for track editing and content metadata management utilising a content editing interface on an artist client computing device 9 as will be described in further detail below.

In embodiments, the content editing server 7 may take the form of a physical server, or a virtualised server implemented by a cloud based server virtualisation service, such as Amazon Web services. In this regard, the content editing server 1 implements a web server 17 for serving requests across the Internet 37 for interfacing with the audio recording slave devices 5, client computing devices 9, content distribution networks 16, acoustic data fingerprinting servers 6 and other computing devices including those which are described herein.

The server 7 comprises a web server 17 acting in unison with various databases and software modules 30 for the purposes of serving requests. In embodiments, the web server 17 may be the Apache Web server which may act in conjunction with a hypertext preprocessor such as the PHP hypertext preprocessor for implementing the functionality herein. Furthermore, the database may be a relational database, such as the MySQL database, including a file system database for storing large binary data such as the recorded audio data as described herein.

As can be specifically seen from FIG. 1, the server 7 comprises an audio database 8 in operable communication with the web server 17 configured for the purposes of storing audio data received from the audio recording slave devices 5. In this regard, for the purposes of communicating with the content editing server 7, each audio recording slave device 6 may comprise an associated web interface 4 allowing communication between the audio recording slave devices 5 and the content editing server 7.

In embodiments, the web interface 4 is configured so as to allow the content editing server 7 to periodically poll each audio recording slave device 5 to ascertain whether recorded audio exists for the purposes of retrieval and further processing and content editing as described herein.

In this manner, the web server 4 may periodically report the allocated IP address of the audio recording slave device 5 via the Internet 37 to the content editing server 7 so as to allow the content editing server 7 to connect to the audio recording slave device 5 accordingly.

In further operable communication with the content editing server 7 is a plurality of client computing devices 9 generally used by artists for the purposes of scheduling live performance recordings, content editing and the like including that which is described herein. The client computing device 9 may take on differing embodiments such as desktop computing devices, mobile computing devices including mobile communication devices such as smart phones and the like.

The client computing device 9 is configured for displaying a content editing interface 38. In embodiment as will be described in further detail below, the content editing interface 38 comprises a track editing interface 10 as substantially shown with reference to FIG. 2 and a metadata editing interface 14 as substantially shown in FIG. 3 for the purposes of editing metadata 15 associated with various audio tracks configured utilising the track editing interface 10.

In this regard, the content editing interface 38 may be browser 13 based such as utilising the Mozilla Firefox or Google Chrome web browser application executing on a personal computing device. Alternatively, the content editing interface 38 may be mobilephone software application implemented wherein a software application is downloaded to a mobile communication device from a software application store, such as from the Apple App Store or the like for installation on the mobile communication device for the purposes of implementing the content editing interface 38 as is described herein and other functionality.

As can be seen, the software modules 30 of the server 7 comprises a content editing interface management module 34 configured to manage the content editing interface 38.

Now, in use, an artist may wish to record a live performance. As such, utilising the content editing interfacing the 38, the artist will configure a live performance schedule. For example, at a particular venue 6, various bands may be playing wherein the artist may configure that their band is playing from 7 PM to 8 PM on 26 Feb. 2017. As such, utilising the content editing interface 38, the artist inputs the schedule including the start and end times. Other information may be input such as a venue identification and the like.

Now, the content editing server 7 is configured to receive the live performance schedule data from the client computing device 9 so as to be able to identify the appropriate audio recording slave device 5 at the nominated venue 6 so as to be able to send the live performance schedule configuration data to the appropriate audio recording slave device 5.

As can be seen from the FIG. 1, the system 1 comprises two venues indicated for illustrative purposes. In this regard, the server 7, having identified the first displayed venue 6 as the appropriate venue, is configured to send the live performance schedule data to the audio recording slave device 5 at the venue 6.

In embodiments, prior to recording, technicians may visit the venue 6 for the purposes of installation of the audio recording slave device 5.

In a preferred embodiment, the audio recording slave device 5 is a small form factor ruggedised computing device suited to the potentially harsh operating environments of live performances. In embodiments, the audio recording slave device 5 may be a rackmounted computing device. In embodiments, the audio recording slave device 5 may take the form of a blade server or the like comprising adequate processing, memory, data storage, audio interface and network interconnectivity for the purposes described herein.

Such implementation need not involve the artist or their band members. During the installation of the audio recording slave device 5, the technician may configure the audio recording slave device 5 to receive audio data from various inputs. Specifically, as can be seen, the audio recording slave device 5 comprises an audio input interface 18 configured to receive audio data from a plurality of audio sources.

In embodiments, the audio input interface 18 is configured to receive stereo microphone data from left and right microphones 19. In additional or alternative embodiment, the audio input interface 18 is configured to receive stereo audio data from a mixing deck or the like. Differing audio inputs may be equally utilised within the purposive scope of the embodiment described herein.

In the installation of the audio recording slave device 5, the system 1 may be configured to implement an audio configuration iteration wherein the audio recording slave device 5 is configured to output noise via a noise generator 20 (such as white noise, pink noise and the like) for recording via the audio input interface 18 for quality measuring purposes.

The audio configuration may be implemented by the audio recording slave device 5 itself or in conjunction with instructions received from the server 7. For the latter case, upon each new audio recording slave device 5 being brought online, the content editing server 5 is configured to implement a registration stage wherein the audio recording slave device 5 is registered and subsequently taken through an audio quality measuring iteration to ensure that the recorded is of sufficient quality for the purposes described herein. It should be noted that audio quality measurement may be implemented by the system 1 prior to each live recording so as to account for variations in microphone placement and the like.

In embodiments, the audio recording slave devices 5 may be left permanently at venues 6.

As alluded to above, a large number of audio recording slave devices 5 may be deployed at a large number of venues 6. For example, the content editing server 7 may be configured so as to be able to manage in excess of 5000 audio recording slave devices 5.

As such, and as alluded to above, the content editing server 7 is configured to send the live performance schedule to the relevant audio recording slave device 5 for storage within memory 39 or the like of the audio recording slave device 5.

As such, having received the live performance audio recording schedule, the audio recording slave device 5 is configured to monitor the start time of the configured recording schedule. As such, at the nominated start time as specified by the recording schedule, the audio recording slave device 5 is configured to automatically start recording. The recording status of the audio recording slave device 5 may be visible via the content editing interface 13 such that the artist may receive reassurance that the audio recording slave device 5 is in fact recording.

Given potential bandwidth limitations across the Internet 37, the audio recording slave device 5 may store recorded audio data within an audio cache 3 for subsequent retrieval or lower bit rate retrieval by the content editing server 7. As alluded to above, in embodiments, the content editing server 7 is configured for periodically polling the audio recording slave device 5 to ascertain whether there is any recorded audio data within the audio cache 3 for retrieval.

At the end of the live performance recording schedule, the audio recording slave device 5 is configured to automatically stop recording. In embodiment as will be described in further detail below, the audio recording slave device 5 is configured for employing audio analysis techniques to identify scenarios where performances extend beyond the end nominated time.

Now, having retrieve the recorded audio data from the audio recording slave device 5, the content editing interface manager module 34 of the server 7 is configured to configure the content editing interface 38 to display a track editing interface 10 comprising at least one timeseries waveform representation of the audio data stored by the server in the audio database 8.

The timeseries waveform representation comprises track demarcation controls configured for controlling track time demarcations to demarcate a plurality of audio tracks. In embodiments as will be described in further detail below, the server 7 may be configured for automated track demarcation identification utilising audio analysis.

Furthermore, the content editing interface further comprises a metadata editing interface 14 configured for editing metadata associated with each of the audio tracks. In further embodiments as will be described in further detail below, the server 7 is configured for automated track identification for the purposes of automated generation of the metadata.

The content editing interface 38 may implement other editing functionalities such as audio level optimisation functionality and the like.

Now, having allowed the configuration of the audio tracks utilising the content editing interface 38, the server 7 is configured to distribute the plurality of audio tracks and associated metadata.

Such distribution may take place via sending the edited audio tracks and associated metadata to a third party content distribution network 16, such as Apple iTunes or the like for online retailing.

In sending or making available of the edited audio tracks and associated meta data to the third party content distribution network 16, the content editing server 7 may package the audio and associated meta data into a meta data transmission format that carries both the meta data and the audio data of the audio tracks such that the recipient content distribution network 16 may readily ascertained the relevant information in relation to the audio content including for the purposes of rights holders recompense. In embodiments, the DDEX meta data transmission format may be utilised.

In alternative embodiments, the content editing server 7 may itself implement online retailing of audio track functionality including payment processing, checkout functionality and the like allowing users to download audio tracks and handle the payment process therefor.

Track Editing Interface 10

Figure 2:
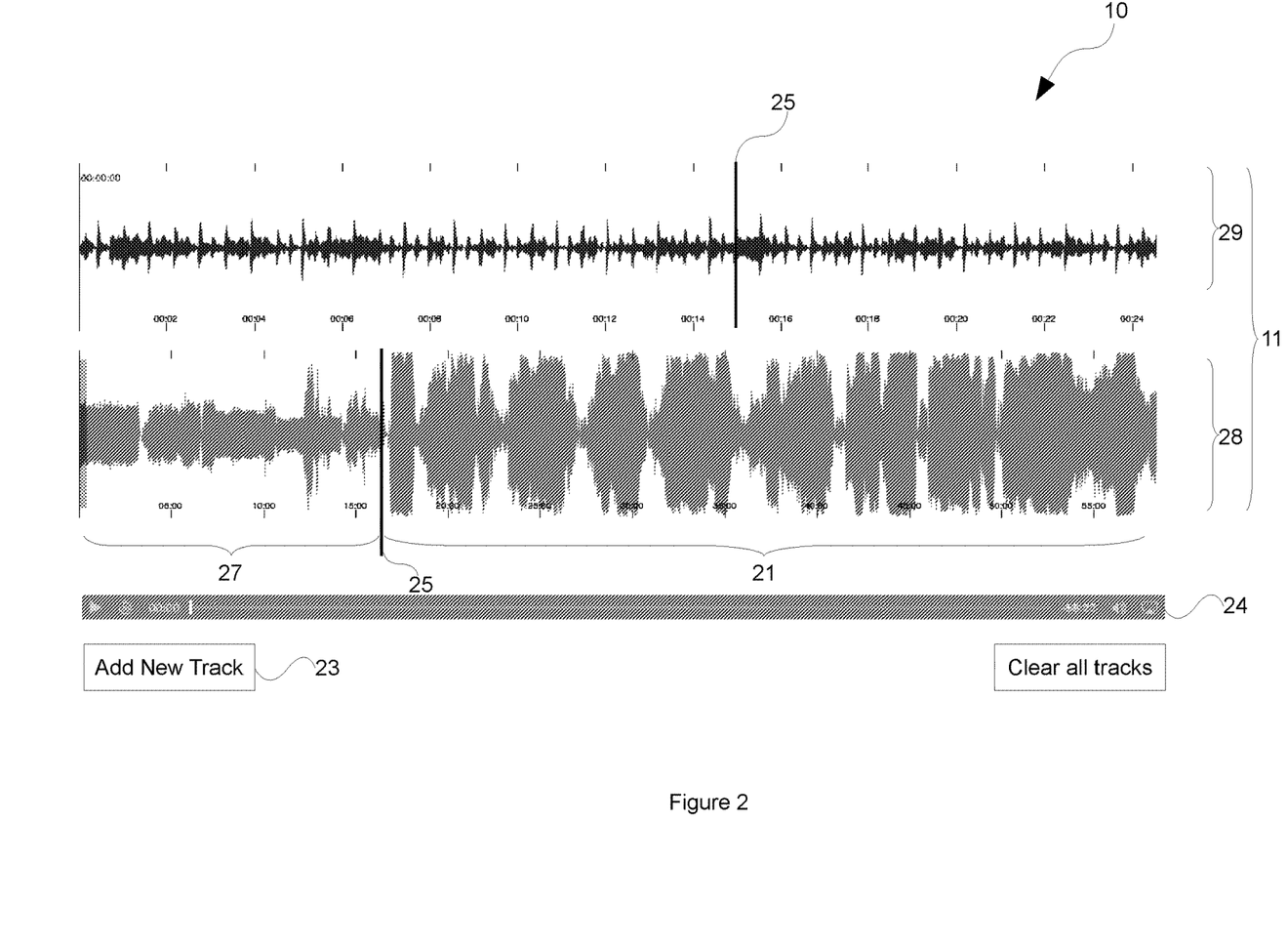
FIG. 2 shows an exemplary track editing interface of the track editing software application of the client computing device of the system of FIG. 1 and especially a track editing interface in accordance with embodiments of the present disclosure.

Turning now to FIG. 2, there is shown an exemplary track editing interface 10 displayed by the client computing device. As alluded to above, having recorded the live performance in the manner described above, the artist may subsequently authenticate with the server 7 utilising the client computing device 9 for the purposes of viewing the recorded audio tracks.

Specifically, the track editing interface 10 comprises a waveform display 11 comprising a timeseries amplitude waveform display of the recorded audio data. The artist may pan and zoom the waveform display 10 during the audio track configuration process.

During the audio track configuration process, one or more audio tracks 12 will be configured by the artist.

As can be seen, the interface 10 comprises the waveform display 11. In this particular embodiment, the waveform display 11 comprises a major waveform display 28 showing the entirety of the recorded audio data and a minor waveform display 29 showing a zoomed in selection of the recorded audio data.

The waveform display 11 comprises at least one audio track boundary demarcation control 25 used for the purposes of marking track boundaries. In use, the artist, utilising the minor waveform display 29 will configure the lateral location of an audio track start demarcation control 25 and an audio track end demarcation control 25 and then utilise the add new track button 23 to create a new track.

In embodiments as will be described in further detail below, the server 7 is configured for audio analysis so as to automate the placement of the demarcation controls 25. As such, the artist may review the interface 10 so as to confirm that the demarcations have been appropriately placed and if not, edit them accordingly.

As is shown in the metadata editing interface 14 as is described in further detail below with reference to FIG. 3, the content editing interface 38 comprises a plurality of created audio tracks 12.

As such, upon activation of the "add new track" button 23, the page 10 is configured to create a new audio track, shown as audio track 27 within the audio tracks 12, the audio track 27 comprising audio track boundaries set in accordance with the locations of the audio track boundary markers 25.

The track editing interface 10 comprises a play out control 20 for allowing the artist to listen to a selected portion of the audio data and control the volume accordingly. The play out control 20 may be configured for listening to a portion of the audio track data as bounded by the audio track boundary markers 25 or a selected track from the audio tracks 12.

In a preferred embodiment, for interface responsiveness and the like, the server 7 may be configured to serve compressed audio data to the browser 30 for the purposes of configuring the audio tracks. In this manner, the artist may utilise the low bit rate audio data simply for the purposes of configuring audio track boundaries and the like where after, once configured, the Internet server 7 is configured to create high bit rate audio track data in accordance with the configurations received from the configuration page 10.

Metadata Editing Interface

As alluded to above, and turning now to FIG. 3, for the newly created track 27, the artist may input various metadata as shown by the metadata columns 22. In the example shown, the metadata may comprise the start time of the track, the end time of the track, the track name, a list of composers, a list of artists, the mixing engineer, the genre, the publisher, the label and various keywords. Other metadata may also be provided, including album art.

As can be seen from the page, the artist has configured a number of tracks 12. Specifically, the number of tracks 12 comprise a first track 27 corresponding in colour representation to the portion of the audio track data 27 of the major waveform display 28. Similarly, track 21 corresponds to audio data portion 21 of the major audio data waveform representation.

It should be noted that in embodiments, other configuration may be set other than shown on the exemplary page 10, such as relating to various audio effects.

The artist utilises the "save and continue" button 7 to complete the audio track configuration process.

Thereafter, in an embodiment, the web server 17 is configured to display a license configuration page wherein the user may select an appropriate licencing regime for the audio tracks. In an embodiment, the artist may elect to utilise the standardised audio license.

In embodiments, the server 7 may store a plurality of available audio licenses so as to allow for the selection of an appropriate audio license therefrom by the artist.

In embodiment and as will be described in further detail below, the server 7 may be configured for automating the generation of the metadata content such that in a similar manner, the artist may review the generated metadata.

Audio Analysis of the Audio Data for Automated Live Performance Schedule End Time Variation Detection In embodiments, the system 1 may be configured for analysis of the audio data for automated live performance schedule end time variation detection so as to avoid inadvertent on recording of live performances extended beyond the scheduled time such as during encores and the like.

In embodiments, the schedule and time variation detection may be implemented by the audio recording slave device. In alternative embodiments, the software modules 30 may comprise a schedule end time variation detection module 35 configured for performing audio analysis and determining whether a performance extends beyond a nominated schedule end time.

Specifically, during a moving window of 180 seconds length, the audio recording slave device 6 may probe for specific signal-amplitude cues that indicate that the performance has begun.

Thereafter, once the audio recording slave device has determined that the performance has begun, a second moving window of 600 seconds length is established which is used to determine the performance's peak and average levels.

As such, if the incoming signal drops significantly below these peak and average levels for a set period of time (180 seconds) then it is determined that the performance has concluded, and thus the recording is finalised.

Conversely, should peak and average levels for the incoming signal for the set period of time remain relatively constant, the audio recording slave device 5 may be configured to extend the recording of audio data beyond the end nominated time.

In embodiments, and as alluded to above, the artist may utilise the content editing interface 38 for the purposes of manipulating the end recording time in substantial real time, such as by being able to extend the end time during a live performance or alternatively to bring forward an end time should the live performance and early, such as by using accessing the content editing interface 38 using a handheld communication device,

Audio Analysis of the Audio Data for Automated Track Demarcation Detection

As alluded to above, in an embodiment, the content editing server 7 is configured for audio analysis of the audio data for automated track demarcation detection. In this manner, and as also alluded to above, when generating the content editing interface 38, the content editing interface 38 may be displayed initially with the demarcation controls 25 placed at the appropriate track demarcation locations as determined in an automated manner by the server 7.

In this embodiment, the software modules 30 comprises a track demarcation detection module 36 configured for this purpose.

As such, by identifying track demarcations, the server 7 reduces or eliminates the manual intervention required from the artist for the purposes of splitting the audio data into various audio tracks.

In embodiments, the server 7 may implement amplitude monitoring so as to be able to detect gaps of silence between songs of a live performance.

In a similar manner as described to above, the server 7 may determine average amplitude audio levels so as to be able to determine a track demarcation indicated by a drop in the amplitude of the received audio signal below the average amplitude audio levels despite there potentially being background noise, such as from a live audience or the like.

The content editing server 7 may further implement time threshold restrictions so as to be able to eliminate false demarcations by, for example, assuming that all audio tracks are at least one minute long.

Acoustic Fingerprinting Technique for Automated Track Identification for Automated Generation of the Metadata In a further embodiment, the server 7 may be configured for utilising acoustic fingerprinting techniques for automated metadata generation.

Specifically, the software modules 30 may comprise a track identification module 31 configured for this purpose. Specifically, the track identification module 31 utilises acoustic fingerprinting techniques for the purposes of recognising various audio tracks.

In embodiments, the acoustic fingerprinting may be implemented via a third party acoustic fingerprint server 36 wherein the audio data, or audio fingerprint data is sent from the content editing server 7 to the acoustic data fingerprinting server.

For example, a performing band may perform a cover of a song by the Beatles. In this manner, utilising the acoustic fingerprinting, the track identification module 31 may be able to identify the track and therefore the associated artist.

In this manner, the track identification module 31 may be used by the server 7 for the purposes of automatically generating the metadata to be associated with the generated audio tracks, such as the track name, artist and other relevant information.

In embodiments where the server 7 is configured for reporting rights holders' data information the server 7 may utilise the artist identified from this acoustic fingerprinting technique so as to be able to automate the rights holder notification process.

Automated Audio Levels Optimisation of the Audio Data

As also alluded to above, in embodiments, the server 7 may be configured for automated audio levels optimisation of the audio data. Specifically, as can be seen, the modules 30 may comprise an audio level optimisation module 32 configured to optimise the recorded audio data accordingly.

As mentioned above, the automated audio level optimisation module 32 automates the conventional sound engineer manual audio level optimisation process.

Specifically, the audio level optimisation module 32 may optimise various audio frequency band levels, such as various treble, bass levels and the like.

Furthermore, the audio level optimisation module 32 may be configured for noise suppression so as to reduce or eliminate background noise, such as white noise, applause noise and the like.

In embodiments, the audio level optimisation module 32 may be configured for generating content distribution and/or broadcast quality audio.

In embodiments, the audio optimisation may be performed prior to the artist reviewing the recorded audio utilising the content editing interface 38 such that, during the content editing process, the artist is able to work with the already optimised audio.

In embodiments, the content editing interfacing 38 may allow the artist to perform audio level optimisation including in further tweaking the audio optimisation of the audio level optimisation module 32.

For example, where the optimisation module 32 to have set a bass levels, the artist may configure the content editing interfacing the 38 to vary the bass level 32 further.

Reporting Rights Holders' Data Specifying at Least One Nominated Right Holder to a Performance Rights Society Server As was also alluded to above, in embodiments, the server 7 may be configured for automating the reporting of rights holder data to performance rights society servers for performing rights holders recompense.

For example, should a band perform a cover of a song, the song may be recognised by the server 7 or identified by the artist utilising the content editing interface 38 such that usage reporting may be transmitted to the performance rights society servers for recording.

As was alluded to above, in embodiment, the server 7 may utilise the track identification module 31 for automating the artist identification process.

Content Distribution of the Plurality of Audio Tracks and Associated Metadata The final process once the plurality in audio tracks and associated metadata have been configured in this manner is to distribute the audio tracks for online retail.

In embodiments, the server 7 may send the audio tracks to a third party content distribution network 6 for online retailing. The third party content distribution network 16 may utilise the metadata associated with the audio tracks for the purposes of populating the content database so as to be searchable by artist, album name, track name, genre and the like.

In alternative embodiments, as opposed to utilising a third party content distribution network 16, the content editing server 7 may itself implement the content distribution.

In this manner, the web server 7 may serve an audio content online retailing resource with which customers may search by various parameters for the purposes of identifying the audio tracks for subsequent checkout and purchase for downloading.

It should be noted that whereas audio data is described herein with reference to a preferred embodiment, in alternative embodiments, the system 1 may equally be applicable for video data.

Interpretation

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A system for distributed live performance scheduled audio recording, cloud-based audio content editing and online content distribution of audio track and associated metadata, the system comprising:
 a content editing server comprising a plurality of software modules comprising:
  a content editing interface management module configured for managing a client computing device content editing interface;

a plurality of audio recording slave devices in communication with the content editing server via Internet, each audio recording slave device comprising:
an audio input interface configured to receive audio data from at least one audio input in use; and
at least one artist client computing device in communication with the content editing server via the Internet, the client computing device configure to display a content editing interface managed by the content editing interface management module of the content editing server, wherein, in use:
the content editing interface is configurable to receive a live performance schedule;
the server is configured to configure an audio recording slave device with the live performance schedule received via the content editing interface;
the audio recording slave device is configured for recording the audio data via the audio input interface in accordance with the live performance schedule;
the server is configured for retrieving and storing, in an audio database, the audio data from the audio recording slave device;
the content editing interface is configured to display:
a track editing interface comprising at least one time series waveform representation of the audio data stored by the server in the audio database, the time series waveform representation comprising track demarcation controls configured for controlling track time demarcations to demarcate a plurality of audio tracks; and
a metadata editing interface configured for editing metadata associated with each of the audio tracks; and
the server is configured to distribute the plurality of audio tracks and associated metadata.

2. A system as claimed in claim 1, wherein the server is configured for audio analysis of the audio data for automated live performance schedule end time variation detection.

3. A system as claimed in claim 2, wherein the audio analysis comprises determining at least one of an average and peak value of the audio data for a first time window and detecting a drop in at least one of an average and peak value of the audio data for a subsequent time window.

4. A system as claimed in claim 3, wherein the first time window is a moving time window.

5. A system as claimed in claim 2, wherein the audio analysis further comprises detecting a signal amplitude queue indicative of a start of a performance.

6. A system as claimed in claim 1, wherein the server is configured for audio analysis of the audio data for automated track demarcation detection.

7. A system as claimed in claim 6, wherein the audio analysis comprises audio amplitude detection.

8. A system as claimed in claim 6, wherein the track demarcation controls are placed at locations of the time series waveform in accordance with the automated track demarcation detection.

9. A system as claimed in claim 8, wherein the lateral locations of the track demarcation controls are user configurable so as to vary the track time demarcations.

10. A system as claimed in claim 1, wherein the timeseries waveform representation comprises a major timeseries waveform representation representing the audio data and a minor timeseries waveform representation representing a subset of the audio data.

11. A system as claimed in claim 10, wherein the timeseries waveform representation is configured for panning.

12. A system as claimed in claim 10, wherein the timeseries waveform representation is configured for zooming.

13. A system as claimed in claim 1, wherein the server is configured for utilising an acoustic fingerprinting technique for automated track identification for automated generation of the metadata associated with each of the audio tracks.

14. A system as claimed in claim 1, wherein the server is configured for automated audio levels optimisation of the audio data.

15. A system as claimed in claim 14, wherein the content editing interface further comprises an audio level optimisation interface.

16. A system as claimed in claim 1, wherein the server is configured for reporting rights holders' data specifying at least one nominated right holder to a performance rights society server.

17. A system as claimed in claim 16, wherein the server is configured for utilising an acoustic fingerprinting technique for identifying the least one nominated right holder.

18. A system as claimed in claim 1, wherein, in distributing the plurality of audio tracks and associated metadata, the server is configured to send the plurality of audio tracks and associated metadata to a $3^{rd}$ party content distribution network server.

19. A system as claimed in claim 1, wherein, in use:
the server is configured to:
send audio configuration data to the audio recording slave device;
the audio recording slave device is configured to:
output, via an audio output interface, audio configuration audio comprising at least one of white noise, swept sinewave and pink noise audio in accordance with the audio configuration data;
receive, via the audio input interface, received audio configuration audio; and
make an audio configuration measurement in accordance with the received audio configuration audio;
transmit, to the server, the received audio configuration audio and the audio configuration measurement.

* * * * *